Dec. 31, 1968  E. HORVATH ETAL  3,419,353
PRODUCTION OF THIONYL CHLORIDE FROM HYDROGEN
CHLORIDE, SULFUR AND OXYGEN
Filed July 29, 1966
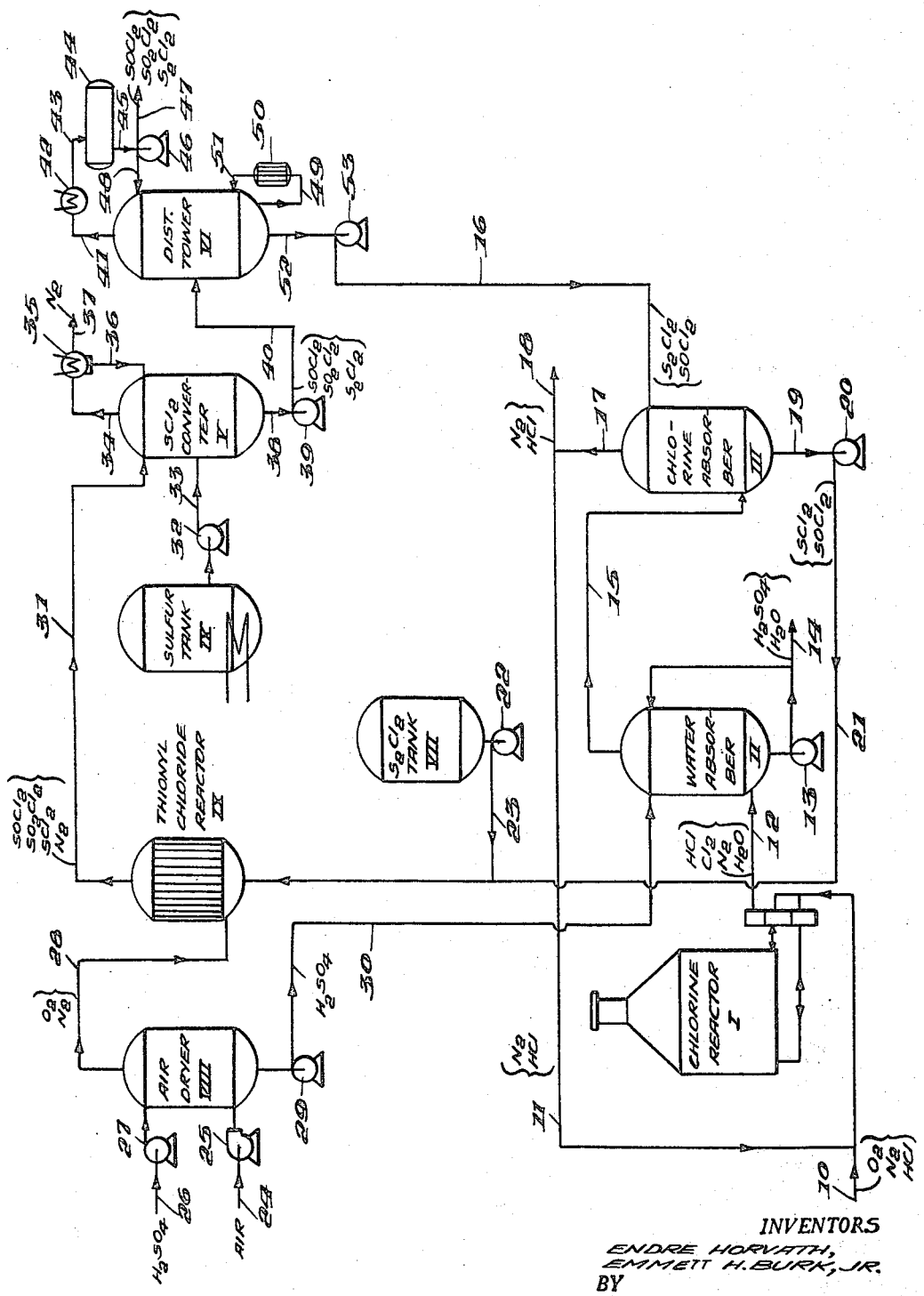
INVENTORS
ENDRE HORVATH,
EMMETT H. BURK, JR.
BY
McLean, Morton and Boustead
ATTORNEYS United States Patent Office 3,419,353
Patented Dec. 31, 1968

3,419,353
PRODUCTION OF THIONYL CHLORIDE FROM HYDROGEN CHLORIDE, SULFUR, AND OXYGEN
Endre Horvath, Chicago, and Emmett H. Burk, Jr., Glenwood, Ill., assignors to Sinclair Research, Inc., New York, N.Y., a corporation of Delaware
Filed July 29, 1966, Ser. No. 568,968
8 Claims. (Cl. 23—203)

ABSTRACT OF THE DISCLOSURE

Thionyl chloride is prepared by a series of steps including oxidizing hydrogen chloride with oxygen to produce a mixture containing hydrogen chloride, chlorine and water. The mixture is dried to obtain an essentially anhydrous mixture containing chlorine and hydrogen chloride. The chlorine of the mixture is reacted with sulfur monochloride to form sulfur dichloride and hydrogen chloride is removed from the sulfur dichloride-containing reaction product. Separated hydrogen chloride is recycled to the hydrogen chloride oxidation step. About 30 to 70% of the sulfur dichloride of the sulfur dichloride-containing reaction product is oxidized to form thionyl chloride and the essential balance of the sulfur dichloride is reacted with sulfur to form sulfur monochloride. The thionyl chloride is recovered by distillation and the sulfur monochloride product is passed to the chlorine-sulfur monochloride reaction step.

---

This invention relates to the production of thionyl chloride and more particularly concerns a new and economical process for converting hydrogen chloride, sulfur and oxygen into high yields of thionyl chloride.

Commercial processes for the preparation of thionyl chloride, $SOCl_2$, are generally based on the oxidation of sulfur dichloride, $SCl_2$, with sulfur trioxide or oxygen or a combination of sulfur dioxide and chlorine. These reactions may be represented as follows:

(1) $SCl_2 + SO_3 \rightarrow SOCl_2 + SO_2$ (2) $2SCl_2 + O_2 \rightarrow SO_2Cl_2 + SCl_2 \rightarrow 2SOCl_2$ (3) $SCl_2 + Cl_2 + SO_2 \rightarrow 2SOCl_2$ The synthesis is often carried out in plural steps; for example, sulfur dichloride is usually first formed, or formed in situ, by the reaction of one mole of sulfur monochloride, $S_2Cl_2$, with one mole of chlorine, as disclosed by Pechukas in U.S. Patent No. 2,431,823. Then the sulfur dichloride is converted as indicated in the equations.

Since hydrogen chloride is often a by-product material it would be advantageous to synthesize thionyl chloride through the use of hydrogen chloride. The direct reaction of sulfur dioxide and hydrogen chloride to form thionyl chloride could be theoretically written as:

(4) $2HCl + SO_2 \rightleftharpoons SOCl_2 + H_2O$

As indicated, this is an equilibrium reaction but, due to the great reactivity of $SOCl_2$ with water, the conversion to $SOCl_2$ is negligible at all temperatures. It would be economically advantageous, then, if there were some other method, feasible and efficient, of reacting by-product HCl to produce thionyl chloride.

It has now been found that excellent yields of thionyl chloride may be prepared by the following serial steps: (1) oxidation of HCl with oxygen, (2) drying of the product to obtain an essentially anhydrous chlorine-hydrogen chloride mixture, (3) absorbing the chlorine with $S_2Cl_2$ to form $SCl_2$, (4) removing HCl from the $SCl_2$ product, (5) oxidizing the $SCl_2$ with oxygen and (6) recovering a reaction product containing $SOCl_2$. A portion of the $SCl_2$ can be reacted with sulfur to form $S_2Cl_2$.

The chemistry of the process is outlined in the following equations:

(5) $2HCl + \frac{1}{2}O_2 \rightleftharpoons H_2O + Cl_2$ (6) $Cl_2 + S_2Cl_2 \rightleftharpoons 2SCl_2$ (7) $SCl_2 + \frac{1}{2}O_2 \rightleftharpoons SOCl_2$ (8) $SCl_2 + S \rightarrow S_2Cl_2$ The above equations outline a process for the preparation of thionyl chloride by the following overall equation obtained by combining the above equations:

(9) $2HCl + S + O_2 \rightarrow SOCl_2 + H_2O$

Thus, a very inexpensive, essentially two-step process has been found for the conversion of HCl to thionyl chloride by employing sulfur and oxygen as oxidants and removing water prior to the formation of the thionyl chloride.

According to our invention, HCl can be oxidized with oxygen, or an oxygen-containing gas such as air, over a suitable oxidation catalyst such as a Deacon catalyst, for instance, at temperatures of about 400° C. to 550° C., to form a mixture of HCl, $Cl_2$ and water.

The production of molecular chlorine by oxidation of hydrogen chloride is a process well described in the art. One of the original methods, known as the Deacon process, utilizes, as a catalyst, copper chloride impregnated on pumice. Numerous modifications of the basic process are known. For instance, one such modification utilizes as a catalyst a mixture of ferric oxide and potassium chloride, another, a molten mixture of ferric and potassium chlorides. Often the catalysts employed comprise compounds or mixtures of compounds containing iron and/or copper together with promoters such as beryllium, magnesium, rare earth metals, chlorides of cadmium, tin, antimony, the alkali and alkaline earth metals and the like. As alternatives for iron or copper compounds, chlorides of the other elements of the first transition series are suitable, e.g., chlorides of titanium, vanadium, chromium, manganese, cobalt and nickel. Copper-containing catalysts promoted with rare earth metals are often preferred. Catalyst and promoter may, if desired, be used in conjunction with a support, or diluent, material such as alumina, silica, magnesia, silica-alumina, carbon, fuller's earth, etc. In summary, the numerous oxidation catalysts useful for the production of $Cl_2$ from HCl may be employed in the present invention.

The $H_2O$ formed in the initial oxidation step can be removed by drying the gas stream, e.g., with sulfuric acid or by condensation (although some loss of chlorine may result in the latter technique), thereby providing an essentially anhydrous stream of HCl and $Cl_2$. The molecular chlorine in this stream can then be absorbed by $S_2Cl_2$, e.g., at temperatures of about —20° C. to +25° C., preferably —20° C. to 0° C., to form $SCl_2$, with the HCl being insoluble in the system and easily removable, for example, as an overhead stream.

Although the absorption of $Cl_2$ by $S_2Cl_2$ proceeds in the absence of catalyst to form $SCl_2$, the reaction may be accelerated to effect as much as say 95% absorption of the $Cl_2$ by the presence of minor amounts of a suitable catalyst such as absorbent charcoal or, advantageously, antimony pentachloride, $SbCl_5$. In the latter case, as little as about 0.1 to 0.5 weight percent of $SbCl_5$ will effect as much as a 500% increase in rate of reaction over that obtained without catalyst. Larger amounts, e.g., 1 to 2%, may be used; however, they are generally unnecessary and most often will effect no additional increase in reaction rates. Absorbent charcoal may likewise be used in amounts of about 0.1 to 2%, or more. The insoluble, separated HCl may, if desired, be recycled to the oxidation catalyst.

The $SCl_2$ is oxidized with oxygen, or an oxygen-containing gas, to thionyl chloride, for example, as taught by Evans et al., Faraday Society Transactions, vol. 43, pp. 667–673 (1947), by passing the two over an activated carbon catalyst at a temperature of about 150 to 250° C. As an exemplary activated carbon catalyst may be mentioned a calcium chloride-treated charcoal which may be prepared by soaking charcoal in an aqueous 10% solution of $CaCl_2$, followed by filtering, washing with alcohol and then with ether and drying at about 100° C.

By operating at about a 30 to 70 percent, preferably about 50 percent, conversion level of the $SCl_2$ to thionyl chloride in the latter step, the excess $SCl_2$ can be disproportionated with addition of sulfur to $S_2Cl_2$, e.g., by refluxing at temperatures of about 130 to 180° C., thus generating $S_2Cl_2$ for the next cycle. The reaction of sulfur with sulfur dichloride to generate sulfur monochloride proceeds quite readily merely with the addition of heat; for example, complete conversion of the dichloride to the monochloride may be realized by refluxing with sulfur for 30 minutes, as taught by Evans et al., supra. Separation of the thionyl chloride may advantageously be effected then by fractional distillation at temperatures of about 100–150° C., and the sulfur monochloride bottoms may be cycled to the chlorine absorption step, as mentioned earlier.

A more complete understanding of the invention may be had by reference to the accompanying schematic drawing which is a flow diagram of a preferred embodiment of the process of the invention.

Referring to the drawing, a feed comprising 1095 lbs./hr. oxygen, 50 lbs./hr. nitrogen and 5950 lbs./hr. HCl is passed thru line 10 in admixture with 191 lbs./hr. nitrogen and 3646 lbs./hr. HCl introduced thru line 11 to chlorine reactor I where the HCl is oxidized to an equilibrium mixture of HCl and $Cl_2$. The oxygenated effluent, comprising 4605 lbs./hr. HCl, 4852 lbs./hr. $Cl_2$, 241 lbs./hr. $N_2$, and 1234 lbs./hr. $H_2O$, is passed thru line 12 to water absorber II where the water of reaction is absorbed in 4375 lbs./hr. concentrated sulfuric acid entering water absorber II via line 30. The sulfuric acid and absorbed water are removed via pump 13 and line 14 as dilute sulfuric acid at a rate of 5609 lbs./hr. This dilute sulfuric acid can be reconstituted and returned to the system, e.g., thru line 26 into air dryer VIII, so as to maintain the acid as a concentration of at least about 80% (based on combined weight of $H_2SO_4$ and water) in water absorber II.

The dehydrated effluent from water absorber II is passed thru line 15 to chlorine absorber III wherein the $Cl_2$ is absorbed by 9143 lbs./hr. of recycle $S_2Cl_2$ (containing 14 lbs./hr. of entrained $SOCl_2$) entering the chlorine absorber III via line 16. By controlling the temperature in absorber III the absorption of chlorine is adjusted so that approximately one mole of $Cl_2$ is absorbed per mole of $S_2Cl_2$. The insoluble HCl and $N_2$ are removed overhead from III via line 17 and divided into a first recycle stream passing thru line 11 to the feed stream and a second purge stream removing 959 lbs./hr. HCl and 50 lbs./hr. $N_2$ from the system via line 18. The $SCl_2$ product stream, containing about 13,995 lbs./hr. $SCl_2$ and 14 lbs./hr. $SOCl_2$ is exited from chlorine absorber III via line 19 and pump 20 and passed thru line 21 in admixture with 98 lbs./hr. of make-up $S_2Cl_2$, introduced from $S_2Cl_2$ tank VII via pump 22 and line 23, to thionyl chloride reactor IV wherein the $SCl_2$ is approximately 50 percent oxygenated with dry atmospheric oxygen to $SOCl_2$. Air is supplied to air dryer VIII via line 24 and blower 25 and is scrubbed therein with concentrated sulfuric acid admitted thru line 26 via pump 27. The dried air, comprising 1130 lbs./hr. $O_2$ and 3716 lbs./hr. $N_2$, is passed thru line 28 to thionyl chloride reactor IV, while the slightly diluted sulfuric acid is passed via pump 29 and line 30 to water absorber II.

The effluent from reactor IV, comprising 8075 lbs./hr. $SOCl_2$, 185 lbs./hr. $SO_2Cl_2$, 6977 lbs./hr. $SCl_2$ and 3716 lbs./hr. $N_2$, is passed thru line 31 to $SCl_2$ converter V where it is refluxed with 2173 lbs./hr. sulfur supplied to the converter by sulfur tank IX, pump 32 and line 33. Reactant vapors leave converter V thru line 34, are condensed by condenser 35 and returned to the converter via line 36, 3716 lbs./hr. $N_2$ being removed from the system via purge line 37.

The converter effluent, comprising 8075 lbs./hr. $SOCl_2$, 185 lbs./hr. $SO_2Cl_2$ and 9150 lbs./hr. $S_2Cl_2$, is removed from converter V via line 38 and pump 39 and passed thru line 40 to distribution tower VI. Overhead vapors exit tower VI thru line 41, are condensed by condenser 42 and pass thru line 43 to receiver 44. The condensed distillate leaves tank 44 thru line 45, is divided by pump 46 into a first product stream leaving the system thru line 47, and comprising 8061 lbs./hr. $SOCl_2$, 185 lbs./hr. $SO_2Cl_2$ and 7 lbs./hr. $S_2Cl_2$, and a second recycle stream returning to tower VI via line 48. Distillation tower bottoms are heated by cycling thru line 49 to reboiler 50 and back to the tower via line 51. The distillation tower bottoms, comprising 14 lbs./hr. $SOCl_2$ and 9143 lbs./hr. $S_2Cl_2$, are removed thru line 52 and returned to chlorine absorber III by pump 53 and line 16.

Thus, in the foregoing example, oxygen, hydrogen chloride and sulfur are reacted in accordance with the method of the present invention to provide an excellent, about 78%, yield of thionyl chloride. The preferred embodiment is merely illustrative, various additions and alterations being likewise contemplated within the scope of the present invention. There may, of course, be employed, wherever the need arises, heat exchange means, additional pumps, filters, etc., in accordance with well known engineering principles.

We claim:

1. A process of preparing thionyl chloride which comprises the steps of oxidizing hydrogen chloride with oxygen to produce a mixture containing hydrogen chloride, chlorine and water, drying said mixture to obtain an essentially anhydrous mixture containing chlorine and hydrogen chloride, reacting the chlorine of said essentially anhydrous mixture with sulfur monochloride to form sulfur dichloride, removing hydrogen chloride from the sulfur dichloride-containing reaction product, passing separated hydrogen chloride to said hydrogen chloride oxidation step, oxidizing with oxygen about 30 to 70% of the sulfur dichloride of said sulfur dichloride-containing reaction product to form thionyl chloride, reacting the essential balance of the sulfur dichloride with sulfur to form sulfur monochloride, recovering the thionyl chloride by distillation and passing produced sulfur monochloride to said chlorine-sulfur monochloride reaction step.

2. The process of claim 1 wherein the hydrogen chloride is oxidized at temperatures of about 400 to 550° C. in the presence of a copper-containing catalyst.

3. The process of claim 2 wherein the product resulting from the oxidation of the hydrogen chloride is dried with sulfuric acid.

4. The process of claim 2 wherein the reaction of sulfur dichloride with sulfur is conducted at temperatures of about 130 to 180° C.

5. The process of claim 4 wherein the thionyl chloride is recovered by distillation at temperatures of about 100 to 150° C.

6. A process of preparing thionyl chloride which comprises the steps of oxidizing hydrogen chloride with oxygen over an oxidation catalyst at a temperature of about 400 to 550° C. to produce a mixture containing hydrogen chloride, chlorine and water, drying said mixture to obtain an essentially anhydrous mixture containing chlorine and hydrogen chloride, reacting the chlorine of said essentially anhydrous mixture with sulfur monochloride at a temperature of about −20° C. to +25° C. to form sulfur dichloride, separating hydrogen chloride from the sulfur dichloride-containing reaction product, passing separated hydrogen chloride to said hydrogen chloride oxidation step, oxidizing with oxygen about 30 to 70 percent of the sulfur dichloride of said sulfur dichloride-containing product at a temperature of about 150 to 250° C. to form thionyl chloride, reacting the essential balance of the sulfur dichloride with sulfur at a temperature of about 130 to 180° C. to form sulfur monochloride, recovering the thionyl chloride by distillation and passing produced sulfur monochloride to said chlorine-sulfur monochloride reaction step.

7. The process of claim 6 wherein about 50% of the sulfur dichloride in the sulfur dichloride-containing reaction product is oxidized with oxygen.

8. The process of claim 7 wherein the hydrogen chloride is oxidized in the presence of a copper-containing catalyst.

References Cited

FOREIGN PATENTS 1,001,716   2/1952   France.

OSCAR R. VERTIZ, *Primary Examiner.*

H. S. MILLER, *Assistant Examiner.*

U.S. Cl. X.R.

23—219, 288, 367; 252—441